United States Patent Office 3,808,246
Patented Apr. 30, 1974

3,808,246
2,2'-BIS[CHLOROBIS(TRIETHYLPHOSPHINE)
NICKEL]BIPHENYL
Darryl R. Fahey, Bartlesville, Okla., assignor to Phillips
Petroleum Company, Bartlesville, Okla.
No Drawing. Filed Nov. 30, 1972, Ser. No. 310,809
Int. Cl. C07f 15/00, 15/04
U.S. Cl. 260—439 R    8 Claims

ABSTRACT OF THE DISCLOSURE

New compositions represented by the formula $$A(ML_2X)_2$$

an example of which is 2,2'-bis[chlorobis(triethylphosphine)nickel]biphenyl, are disclosed as are their method of preparation and usage.

---

This invention relates to a new composition of matter, 2,2'-bis[chlorobis(triethylphosphine)nickel]biphenyl.

In one of its aspects, this invention relates to new compositions represented by the formula $A(ML_2X)_2$ wherein A is a divalent aromatic hydrocarbon radical, such as an arylene radical, containing from 6 to about 20 carbon atoms in which radical the two free valences (substituted positions) do not occupy adjacent positions on a single ring; M is a metal selected from the group consisting of nickel, palladium and platinum; L is a ligand having the formula $R_3P$ wherein R is a hydrocarbyl radical containing from 1 to about 10 carbon atoms, such as alkyl, aryl, cycloalkyl or combinations such as alkaryl and the like; and X is a halogen selected from the group consisting of chlorine, bromine and iodine.

The statement relative to the free valences of the arylene radicals is meant to exclude such radicals as the 1,2-phenylene radical.

Examples of compounds represented by the general formula $A(ML_2X)_2$ include 2,2'-bis[chlorobis(triethylphosphine)nickel]biphenyl;
1,4-bis[bromobis(tri-n-butylphosphine)nickel]benzene;
1,3-bis[iodobis(tricyclohexylphosphine)nickel]naphthalene;
9,10-bis[chlorobis(triphenylphosphine)nickel]anthracene;
2,2'-bis[chlorobis(triethylphosphine)palladium]biphenyl;
1,4-bis[chlorobis(tri-n-butylphosphine)palladium]benzene;
1,4-bis[bromobis(tricyclohexylphosphine)palladium]naphthalene;
2,2'-bis[chlorobis(triethylphosphine)platinum]biphenyl;
4,4'-bis[iodobis(trimethylphosphine)platinum]biphenyl;
1,5-bis[bromobis(tri-n-butylphosphine)platinum]naphthalene;
2,5-bis[chlorobis(triethylphosphine)nickel]perylene, and the like.

The compounds of this invention can be prepared from arylenedilithium compounds $A(Li)_2$ by reaction with a tetra-coordinated divalent metal complex of the type $M(L)_2X_2$, both the arylenedilithium compounds and the divalent metal complexes being well known in the art.

The compounds of this invention can be produced at a temperature within the range of from about 0° C. to about 60° C., at any suitable pressure, preferably atmospheric pressure, the reactants being in contact for any suitable time, preferably from about 0.5 to about 24 hours. The reaction is conveniently carried out in the presence of inert diluents such as ethers, alkanes, cycloalkanes or aromatic hydrocarbons employing at least stoichiometric quantities of the reactants, that is, at least a 2/1 mol ratio of $M(L)_2X_2$ to $A(Li)_2$.

The compounds of this invention can also be carried out employing a novel process involving the reaction $$A(X)_2 + 2(L)_2M(L')_r \rightarrow A(ML_2X)_2 + 2rL'$$

wherein $(L)_2M(L')_r$ represents a zerovalent complex of nickel, palladium or platinum. In the general formula $(L)_2M(L')_r$, L and M are as previously defined, L' is a neutral ligand which can be the same as L, or L' can be a molecule selected from the group consisting of ethylene, 1,5-cyclooctadiene, diphenylacetylene, and the like. In the above reaction formula, $r$ can be 0 or an integer from 1 to 2 with the sum of $r+2$ being, usually, 3 or 4 or that quantity necessary to provide a stable zerovalent complex. In the formula $A(X)_2$, A and X are as previously defined.

Examples of suitable zerovalent complexes include ethylenebis(triphenylphosphine)nickel(O),
tetrakis(triethylphosphine)nickel(O),
tetrakis(triphenylphosphine)palladium(O),
tetrakis(triphenylphosphine)platinum(O),
tris(triphenylphosphine)platinum(O), and the like.

Inasmuch as the above reaction is of the oxidative addition type, reaction conditions commonly employed for oxidative additions of aryl halides to zerovalent complexes of nickel, palladium or platinum and those reaction conditions previously set out for the reaction involving arylenedilithium as a reactant can be employed. In the reaction involving the zerovalent complex, however, the mol ratio of the zerovalent complex to arylene dihalide can be within the range of from about 1 to 1 to about 10 to 1 with best yields being obtained at a ratio of at least 2 to 1.

The reaction mixture, produced when employing the zerovalent complex, can be washed with water after which the diluent is removed and the product recovered.

Compositions defined by the formula $A(ML_2X)_2$ have utility as catalysts for removal of alkynes from hydrocarbon streams as, for example, removing acetylene from ethylene streams. These compositions can also be used as catalyst components in the dimerization of 1-olefins or conjugated dienes or the codimerization of 1-olefins and conjugated dienes. They are also useful as catalysts for the polymerization of vinyl monomers such as acrylonitrile.

A compound of the present invention was prepared according to the following procedure.

EXAMPLE I

An ethereal solution of 2,2'-biphenylenedilithium was prepared from lithium wire (containing 1% sodium) and 2,2'-dibromobiphenyl according to the procedure described in J. Am. Chem. Soc., 80, 1883 (1958). This solution, estimated to be about 0.045 M in the dilithium compound, was added dropwise with stirring to a solution of 1.4 mmol $(Et_3P)_2NiCl_2$ in 10 ml. of hexane until the entire solution appeared brown, it being estimated that about 0.7 mmol of the dilithium compound had been added at this point.

The reaction was stirred at 25° C. for one hour and then washed with water; the organic phase was thereafter taken to dryness under vacuum. The residue was chromatographed on acidic alumina and a yellow material eluted with a mixture of ether and pentane. Crystallization of the yellow material from methanol gave a brown crystalline product melting at 135–139° C. with decomposition. Analysis of the product for carbon and hydrogen showed 53.2% carbon and 8.3% hydrogen while the calculated values for 2,2'-bis[chlorobis(triethylphosphine)nickel]biphenyl were 53.18% carbon and 8.43% hydrogen.

The following example illustrates another preparation of the compound of this invention.

EXAMPLE II

A solution of 2.7 mmol of $(Et_3P)_2NiCl_2$ in 10 ml. of ether was treated with 30 ml. of the ethereal solution of 2,2'-biphenylenedilithium prepared in Example I and stirred for one hour at 25° C. The mixture was then washed with 25 ml. aqueous $NH_4Cl$ at 0° C. and 20 ml. of pentane added. The organic layer was dried over $MgSO_4$ and filtered through acid-washed alumina. The filtrate was evaporated to dryness and the red-brown oil taken up in methanol and the product crystallized therefrom. Following recrystallization from cyclohexane, aqueous methanol, and pentane in that order, brown crystals were obtained which melted at 136–139° C. with decomposition. A sample of the product which was recrystallized from cyclohexane was analyzed for percent carbon, hydrogen and chlorine which gave 50.57, 8.46 and 8.6, respectively, while calculated values were 53.18, 8.43 and 8.72, respectively, for the compound 2,2'-bis [chlorobis(triethylphosphine)nickel]biphenyl. The disparity between the percent carbon values indicated that the sample was not as pure as desired. However, the percent chlorine and an NMR analysis supported the designation of the product given above. In this run the yield of the desired product was about 11% of the theoretical yield based on the starting nickel complex.

The following example illustrates another preparation of the compound of this invention.

EXAMPLE III

A mixture of bis(1,5-cyclooctadiene)nickel(O) (8 mmol) with 10 ml. of benzene was treated with 19 mmol of triethylphosphine to generate the complex, bis(triethylphosphine)(1,5-cyclooctadiene)nickel(O) in situ. This reaction mixture was then treated with 6.4 mmol of 2,2'-dibromobiphenyl in benzene. The resulting mixture was allowed to stand with occasional shaking for two hours at room temperature (about 25° C.). The mixture was filtered, washed with aqueous $NH_4Cl$ at 0° C., dried over $MgSO_4$ and concentrated under vacuum. The oily residue was diluted with pentane and the pentane-soluble fraction evaporated to dryness under vacuum. The product oil was stored in the cold for 2–3 days and then filtered to remove red crystalline needles of $(Et_3P)_2NiBr_2$ which had formed. The filtrate from this step, combined with pentane which had been used to wash the $(Et_3P)_2NiBr_2$ crystals at −20° C., was passed through an acid-washed alumina column. Four compounds were thereafter eluted from the column. One Compound I, eluted with a mixture of ether/pentane/benzene (20/50/30) was recrystallized from pentane and had a melting point of 98–100° C. Elemental analysis, infrared absorption spectra analysis and nuclear magnetic resonance (NMR) analysis indicated that the compound was 2-phenyl[chlorobis(triethylphosphine)nickel]benzene. It should be noted that a chloro derivative was recovered, rather than the bromo derivative, because exchange of chlorine for bromine occurred on the chromatography column containing acid-washed alumina. The yield of Compound I was about 8% based on the starting nickel complex. Compound II was eluted by an ether/benzene (70/30) mixture. It was recrystallized from a benzene/pentane mixture and showed a melting point of 156–159° C. with decomposition. The elemental analysis showed the compound to have 53.3% carbon and 8.2% hydrogen while the calculated values for the desired complex 2,2'-bis[chlorobis(triethylphosphine)nickel]biphenyl were 53.18% carbon and 8.45% hydrogen. Infrared and NMR analyses also supported the assigned structure to Compound II. Compound II was obtained in 2% yield based on the starting nickel complex. It also appeared that Compound I was obtained from Compound II by acid cleavage of (II) on the alumina column. A trace amount of Compound III was eluted from the column by a mixture of methanol/benzene/ether (2/30/68). It appeared to be $(Et_3P)_2NiCl_2$. A fourth Compound IV eluted with a mixture of methanol/benzene/ether (20/30/50) was not identified.

The higher melting (decomposition) temperature shown for Compound II of this example compared to that shown for the products of Examples I and II was probably indicative of the higher purity of the compound prepared in the instant example.

The following example illustrates a use of the compound of this invention.

EXAMPLE IV

A gas-liquid contact vessel was charged with 0.01 g. of the compound prepared in Example I and 50 ml. of acetonitrile under a nitrogen atmosphere. A mixture of ethylene and acetylene was passed through the liquid phase in the vessel at a rate of 4 ml./min. while the temperature was kept at 25° C. The feedstream and the effluent were analyzed by gas-liquid chromatography with the results obtained shown below.

| Time, hours | Composition, weight, percent | | | |
|---|---|---|---|---|
| | Feedstream | | Effluent | |
| | Ethylene | Acetylene | Ethylene | Acetylene |
| | 38.8 | 61.2 | | |
| 0.5 | | | 63.0 | 36.6 |
| 1.0 | | | 63.4 | 36.6 |
| 1.5 | | | 58.5 | 41.5 |
| 2.0 | | | 56.7 | 43.3 |
| 3.75 | | | 55.4 | 44.6 |

These results demonstrate that a very small amount of the composition of this invention significantly reduced the concentration of acetylene in an ethylene/acetylene mixture when that mixture was contacted with the composition. The increase in acetylene concentration in the effluent during the latter stages of this run indicated that the catalyst was becoming inactive, which was not unexpected, since such a small amount of catalyst was employed.

It will be evident from the foregoing that various modifications can be made to the method of this invention. However, such are considered as being within the scope of the invention.

What is claimed is:

1. A composition of matter having the formula $A(ML_2X)_2$ wherein A is a divalent aromatic hydrocarbon radical containing from 6 to about 20 carbon atoms in which radical the two substituted positions do not occupy adjacent positions on a single ring; M is a metal selected from the group consisting of nickel, palladium and platinum, L is a ligand having the formula $R_3P$ wherein R is a hydrocarbyl radical containing from 1 to about 10 carbon atoms and X is a halogen selected from the group consisting of chlorine, bromine and iodine.

2. A composition of matter as defined in claim 1 selected from the group consisting of 2,2'-bis[chlorobis(triethylphosphine)nickel]biphenyl;
1,4-bis[bromobis(tri-n-butylphosphine)nickel]benzene;
1,3-bis[iodobis(tricyclohexylphosphine)nickel]naphthalene;
9,10-bis[chlorobis(triphenylphosphine)nickel]anthracene;
2,2'-bis[chlorobis(triethylphosphine)palladium]biphenyl;
1,4-bis[chlorobis(tri-n-butylphosphine)palladium] benzene;
1,4-bis[bromobis(tricyclohexylphosphine)palladium] naphthalene;
2,2'-bis[chlorobis(triethylphosphine)platinum]biphenyl;
4,4'-bis[iodobis(trimethylphosphine)platinum]biphenyl;
1,5-bis[bromobis(tri-n-butylphosphine)platinum] naphthalene; and
2,5-bis[chlorobis(triethylphosphine)nickel]perylene.

3. A composition of matter as defined in claim 1 comprising 2,2' - bis[chlorobis(triethylphosphine)nickel]biphenyl.

4. A method of producing the composition of claim 1 which comprises reacting a zerovalent complex of nickel, palladium or platinum having the formula $(L)_2M(L')_r$ with a compound having the formula $A(X)_2$, in which formula L is a ligand having the formula $R_3P$ wherein R is a hydrocarbyl radical containing from 1 to about 10 carbon atoms, M is a metal selected from the group consisting of nickel, palladium and platinum, L' is a neutral ligand which can be L or a molecule selected from the group consisting of ethylene, 1,5-cyclooctadiene and diphenylacetylene, and r is 0 or an integer having a value of from 1 to 2, the sum of $r+2$ being sufficient to provide a stable zerovalent complex, A is a divalent aromatic hydrocarbon radical and X is a halogen selected from the group consisting of chlorine, bromine and iodine.

5. The method of claim 4 in which said zerovalent complex is selected from the group consisting of ethylenebis(triphenylphosphine)nickel(O),
tetrakis(triethylphosphine)nickel(O),
tetrakis(triphenylphosphine)palladium(O),
tetrakis(triphenylphosphine)platinum(O), and
tris(triphenylphosphine)platinum(O).

6. The method of claim 4 in which 2,2'-bis[chlorobis-(triethylphosphine)nickel]biphenyl is prepared by the interreaction of bis(triethylphosphine)(1,5 - cyclooctadiene)nickel(O) and 2,2'-dibromobiphenyl.

7. A method of producing the composition of claim 1 which comprises reacting an arylenedilithium compound having the formula $A(Li)_2$ wherein A is a divalent aromatic hydrocarbon radical containing from 6 to about 20 carbon atoms in which radical the two substituted position do not occupy adjacent positions on a single ring, with a tetra-coordinated divalent metal complex having the formula $M(L)_2X_2$ wherein M is a metal selected from the group consisting of nickel, palladium and platinum, L is a ligand having the formula $R_3P$ wherein R is a hydrocarbyl radical containing from 1 to about 10 carbon atoms and X is a halogen selected from the group consisting of chlorine, bromine and iodine.

8. The method of claim 7 in which 2,2'-bis[chlorobis-(triethylphosphine)nickel]biphenyl is prepared by the interraction of 2,2'-biphenylenedilithium with $(Et_3P)_2NiCl_2$.

References Cited
UNITED STATES PATENTS 3,098,843   7/1963   Luttinger _____ 260—91.3 R
3,686,245   8/1972   Fahey _____ 260—439 R DANIEL E. WYMAN, Primary Examiner A. P. DEMERS, Assistant Examiner U.S. Cl. X.R.

252—431 P; 260—429 R, 677 R